United States Patent
Wood

(10) Patent No.: US 10,820,500 B2
(45) Date of Patent: Nov. 3, 2020

(54) MOWER DECK DUAL WEDGE SYSTEM

(71) Applicant: Diamond Mowers, LLC, Sioux Falls, SD (US)

(72) Inventor: Zachary Wood, Sioux Falls, SD (US)

(73) Assignee: Diamond Mowers, LLC, Sioux Falls, SD (US)

( * ) Notice: Subject to any disclaimer, the term of this patent is extended or adjusted under 35 U.S.C. 154(b) by 296 days.

(21) Appl. No.: 15/949,643

(22) Filed: Apr. 10, 2018

(65) Prior Publication Data

US 2018/0288938 A1    Oct. 11, 2018

Related U.S. Application Data

(60) Provisional application No. 62/484,360, filed on Apr. 11, 2017.

(51) Int. Cl.
| | |
|---|---|
| *A01D 34/81* | (2006.01) |
| *A01D 34/73* | (2006.01) |
| *A01D 34/68* | (2006.01) |
| *A01D 34/82* | (2006.01) |
| *A01D 101/00* | (2006.01) |

(52) U.S. Cl.
CPC ............ *A01D 34/81* (2013.01); *A01D 34/68* (2013.01); *A01D 34/73* (2013.01); *A01D 34/733* (2013.01); *A01D 34/828* (2013.01); *A01D 2101/00* (2013.01)

(58) Field of Classification Search
CPC .... A01D 34/81; A01D 34/733; A01D 34/828; A01D 34/68; A01D 34/73; A01D 34/82; A01D 2101/00; A01D 34/71; A01D 75/182
See application file for complete search history.

(56) References Cited

U.S. PATENT DOCUMENTS

| | | | | |
|---|---|---|---|---|
| 1,836,386 A | | 12/1931 | Nichols | |
| 2,564,586 A | * | 8/1951 | Smith | A01D 34/63 56/14.7 |
| 2,636,333 A | * | 4/1953 | Michaels | A01D 34/63 56/255 |
| 2,642,711 A | * | 6/1953 | Smith | A01D 34/63 56/255 |
| 2,651,159 A | * | 9/1953 | Rountree Sr. | A01D 34/63 56/13.8 |
| 2,787,108 A | * | 4/1957 | Meltzer | A01D 34/84 56/13.8 |

(Continued)

*Primary Examiner* — Thomas B Will
*Assistant Examiner* — Joan D Misa
(74) *Attorney, Agent, or Firm* — Ballard Spahr LLP

(57) ABSTRACT

A mower deck dual wedge system uses a dual wedge configuration to funnel vine like material for cutting to prevent interference with a spindle shaft. The system includes a mower deck having an upper wall and a peripheral. A spindle shaft extends through the upper wall. Each of a pair of wedges is coupled to and extends from the upper wall of the mower deck. Each of the wedges has a pair of lateral sides extending from a tip. The wedges are positioned on opposite sides of the spindle shaft such that the tip of each the wedge faces away from the spindle shaft. A cutting disc is coupled to the spindle shaft and the wedges are positioned between the cutting disc and the upper wall of the mower deck. The cutting disc is rotated by the spindle shaft.

10 Claims, 4 Drawing Sheets

(56) References Cited

U.S. PATENT DOCUMENTS

| | | | | |
|---|---|---|---|---|
| 2,814,924 | A * | 12/1957 | Group | A01D 34/90 56/13.8 |
| 3,000,165 | A * | 9/1961 | Etchison | A01D 34/63 56/13.4 |
| 3,068,630 | A * | 12/1962 | Caldwell | A01D 34/661 56/6 |
| 3,203,161 | A * | 8/1965 | Breisch | A01D 34/73 56/295 |
| 3,369,350 | A * | 2/1968 | Harlan | A01D 34/8355 56/11.9 |
| 3,496,707 | A * | 2/1970 | Kobey | A01D 34/63 56/17.5 |
| 3,522,693 | A * | 8/1970 | Knapp | F16J 15/54 56/1 |
| 3,890,773 | A * | 6/1975 | Frost | A01D 34/63 56/255 |
| 4,227,654 | A | 10/1980 | Seefeld | |
| 4,573,306 | A * | 3/1986 | Smith | A01B 39/166 56/10.4 |
| 4,581,879 | A * | 4/1986 | Anstey | A01F 15/07 100/88 |
| 5,133,176 | A * | 7/1992 | Baumann | A01D 34/685 56/17.4 |
| 5,245,817 | A * | 9/1993 | Hohnl | A01D 43/077 384/488 |
| 5,267,429 | A * | 12/1993 | Kettler | A01D 34/005 56/295 |
| 5,313,770 | A * | 5/1994 | Smothers | A01D 34/416 30/276 |
| 5,361,570 | A * | 11/1994 | Bernardy | A01D 34/005 30/347 |
| 5,365,724 | A | 11/1994 | Wagner | |
| 5,404,697 | A * | 4/1995 | Dewey | A01D 34/6806 56/12.7 |
| 5,657,620 | A * | 8/1997 | Thagard | A01D 34/64 56/15.2 |
| 6,058,822 | A | 5/2000 | Parke | |
| 6,484,481 | B1 * | 11/2002 | Langworthy | A01D 75/30 56/6 |
| 7,311,279 | B2 | 12/2007 | Parke | |
| 7,520,338 | B2 | 4/2009 | Stokes | |
| 8,393,136 | B1 * | 3/2013 | Fraley | A01D 34/64 56/17.1 |
| 8,857,144 | B2 * | 10/2014 | Koester | A01D 34/81 56/255 |
| 9,403,167 | B2 | 8/2016 | Watts | |
| 10,398,079 | B2 * | 9/2019 | Stephenson | A01D 34/665 |
| 10,433,480 | B2 * | 10/2019 | Schaedler | A01D 34/733 |
| 2005/0120698 | A1 * | 6/2005 | Schlasse | A01D 34/81 56/255 |
| 2008/0098704 | A1 * | 5/2008 | Dairon | A01D 34/81 56/11.9 |
| 2008/0256920 | A1 | 10/2008 | Yanke | |
| 2018/0288938 | A1 * | 10/2018 | Wood | A01D 34/81 |
| 2018/0343797 | A1 * | 12/2018 | Lowe | A01D 34/73 |

\* cited by examiner

MOWER DECK DUAL WEDGE SYSTEM

CROSS-REFERENCE TO RELATED APPLICATIONS

I hereby claim the benefit under 35 U.S.C. Section 119(e) of United States Provisional application 62/484,360 filed Apr. 11, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to mower deck devices and more particularly pertains to a new mower deck device for using a dual wedge configuration to funnel vine like material for cutting and prevent interference with a spindle shaft due to wrapping of the vine like material around the spindle shaft.

BRIEF SUMMARY OF THE INVENTION

An embodiment of the disclosure meets the needs presented above by generally comprising a mower deck having an upper wall and a peripheral wall extending downwardly from and around a peripheral edge of the upper wall. The peripheral wall has a pair of spaced ends defining an opening therebetween. A spindle shaft extends through the upper wall. Each of a pair of wedges is coupled to and extends from the upper wall of the mower deck. Each of the wedges has a pair of lateral sides extending from a tip. The wedges are positioned on opposite sides of the spindle shaft such that the tip of each the wedge faces away from the spindle shaft. A cutting disc is coupled to the spindle shaft and the wedges are positioned between the cutting disc and the upper wall of the mower deck. The cutting disc is rotated by the spindle shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
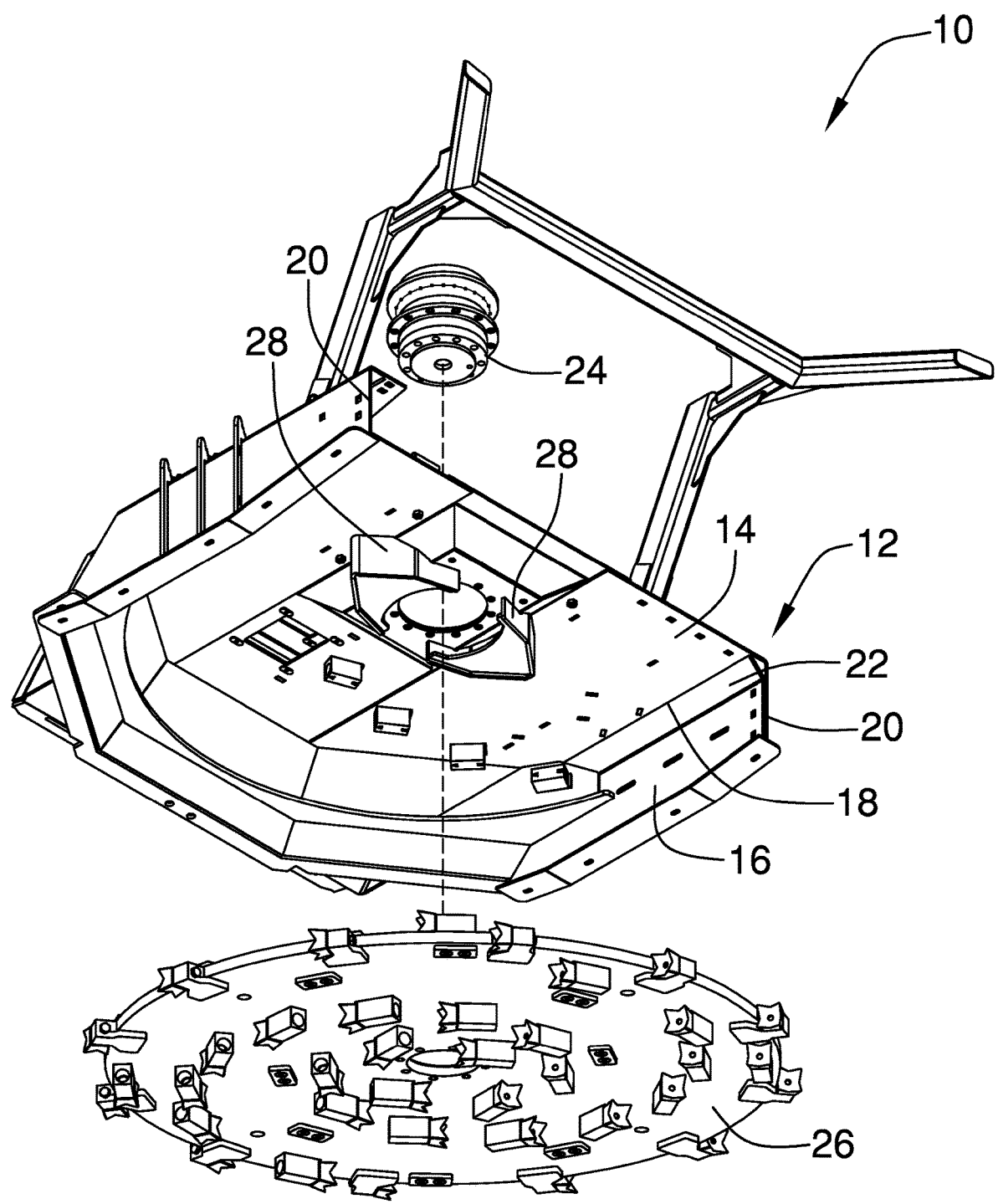
FIG. 1 is an exploded front bottom side perspective view of a mower deck dual wedge system according to an embodiment of the disclosure.
Figure 2:
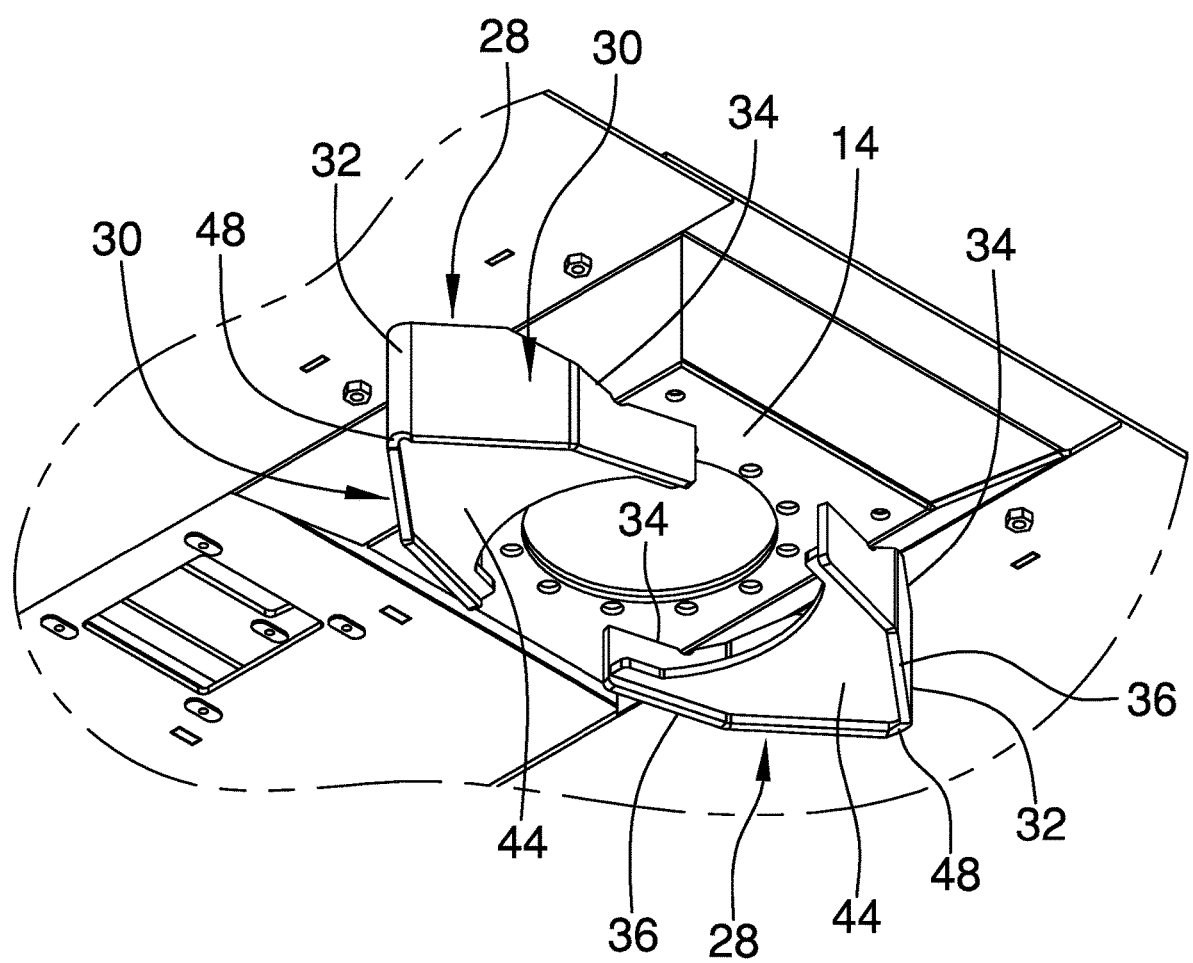
FIG. 2 is a detailed bottom perspective view of an embodiment of the disclosure.
Figure 3:
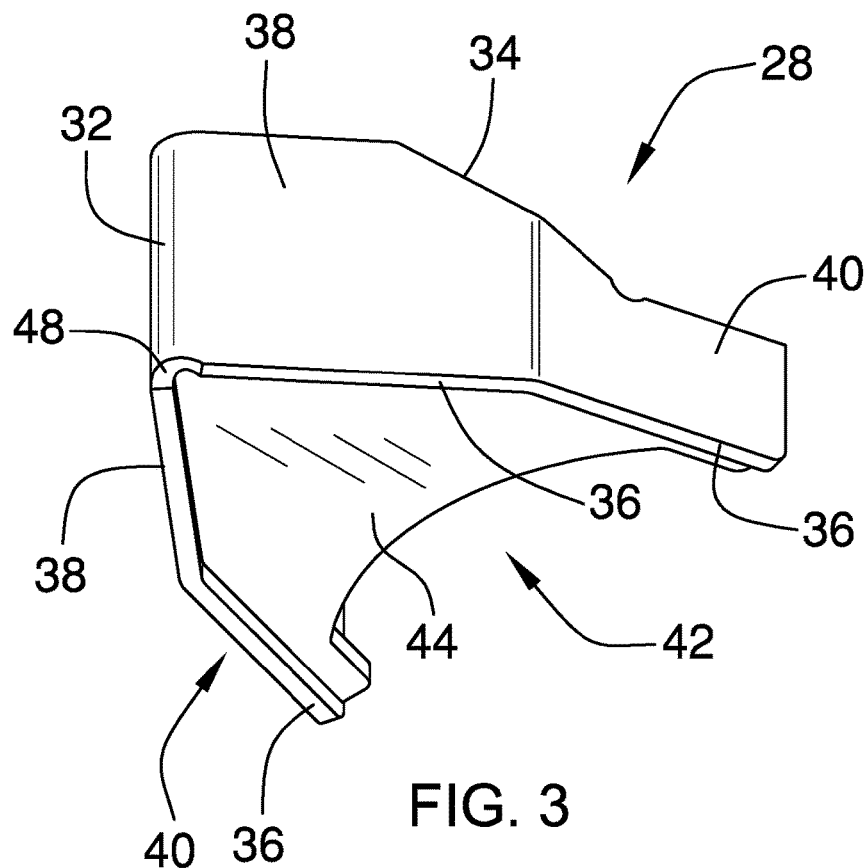
FIG. 3 is a bottom perspective view of a wedge of an embodiment of the disclosure.
Figure 4:
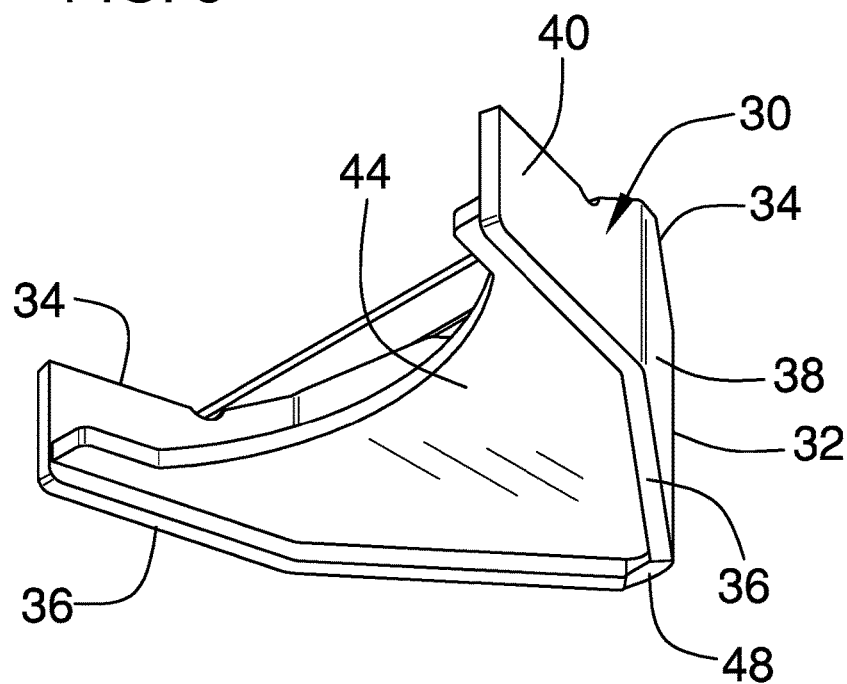
FIG. 4 is a bottom perspective view of a wedge of an embodiment of the disclosure.
Figure 5:
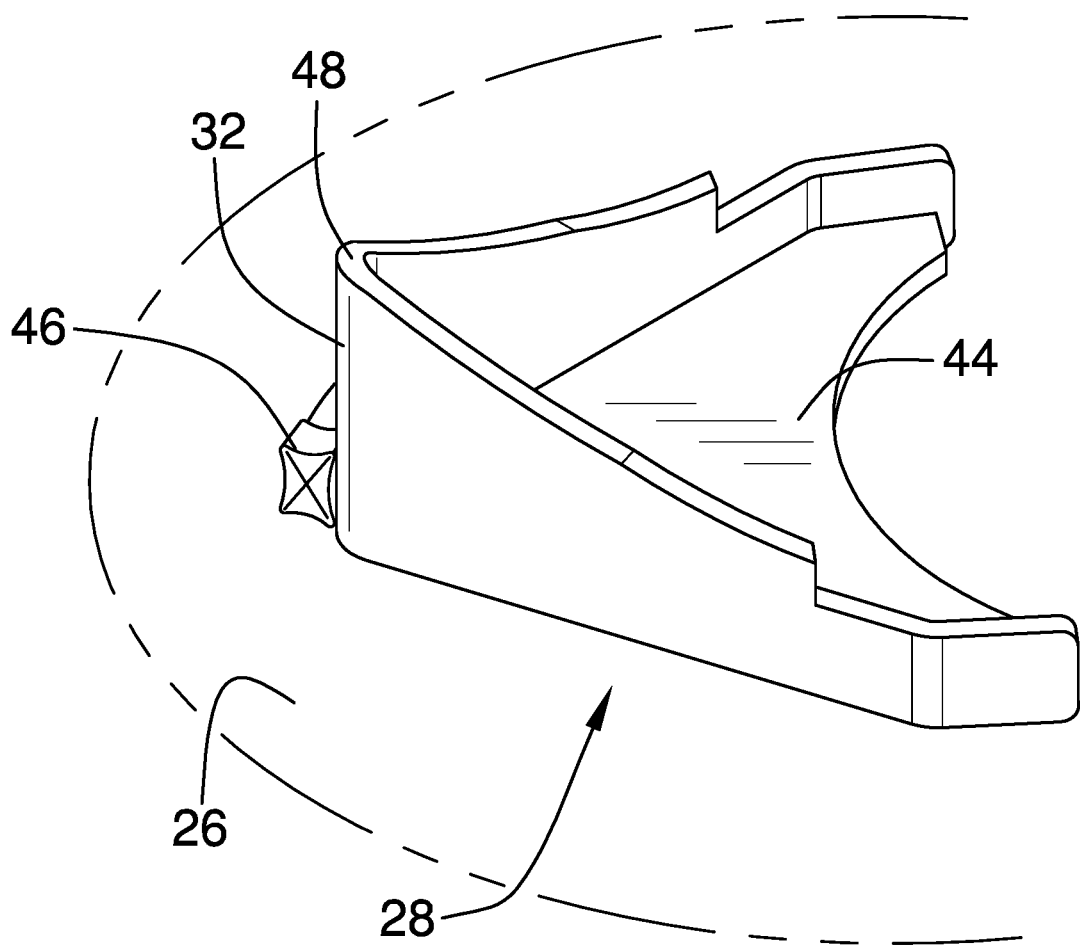
FIG. 5 is a detailed top perspective view of an embodiment of the disclosure in use.

With reference now to the drawings, and in particular to FIGS. 1 through 5 thereof, a new mower deck device embodying the principles and concepts of an embodiment of the disclosure and generally designated by the reference numeral 10 will be described.

As best illustrated in FIGS. 1 through 5, the mower deck dual wedge system 10 generally comprises a mower deck 12 having an upper wall 14 and a peripheral wall 16 extending downwardly from and around a peripheral edge 18 of the upper wall 14. The peripheral wall 16 has a pair of spaced ends 20 defining an opening 22 therebetween. A spindle shaft 24 extends through the upper wall 14. The spindle shaft 24 is of a conventional type commonly used to rotate a cutting disc 26. Each of a pair of wedges 28 is coupled to and extends from the upper wall 14 of the mower deck 12. Each of the wedges 28 has a pair of lateral sides 30 extending from a tip 32. The pair of wedges 28 is positioned on opposite sides of the spindle shaft 24 such that the tip 32 of each wedge 28 faces away from the spindle shaft 24. The pair of wedges 28 is linearly aligned across the spindle shaft 24. A line extending between the tips 32 of the wedges 28 is parallel to a plane extending between the spaced ends 20 of the peripheral wall 16 of the mower deck 12.

Each wedge 28 comprises the lateral sides 30 having a proximal edge 34 coupled to the upper wall 14 of the mower deck 12. Each of the lateral sides 30 extends perpendicularly from the upper wall 14 of the mower deck 12. Each of the lateral sides 30 has a distal edge 36 relative to the upper wall 14 of the mower deck 12. Each of the lateral sides 30 has a first straight section 38 and a second straight section 40. The first straight section 38 is angled relative to the second straight section 40. Each wedge 28 has a broad end 42 with the lateral sides 30 tapering towards the tip 32. The broad end 42 is open. The wedge 28 is symmetrical about a line extending through the tip 32 of the wedge 28 and bisecting the broad end 42 of the wedge 28. A panel 44 is coupled to and extends between the lateral sides 30. The panel 44 is positioned parallel to the upper wall 14 of the mower deck 12. The panel 44 is inset from the distal edge 36 of the lateral sides 30. To facilitate manufacturing each wedge 28 may include a cutout 48 at the tip 32.

The cutting disc 26 is coupled to the spindle shaft 24 wherein the pair of wedges 28 is positioned between the cutting disc 26 and the upper wall 14 of the mower deck 12. The cutting disc 26 is rotated by the spindle shaft 24. An upper cutter 46 is coupled to the cutting disc 26. The upper cutter 46 is positioned to pass in close proximity to the tip 32 of each wedge 28 as the cutting disc 26 is rotated by the spindle shaft 24. Thus, the upper cutter 46 is configured for shearing vine like material extending over each tip 32 as the upper cutter 46 passes by the tip 32.

In use, the mower deck 12, spindle shaft 24, and cutting disc 26 are used in a conventional manner. The wedges 28 are positioned with the tips 32 facing laterally relative to the opening 22. As the spindle shaft 24 rotates, the wedges 28 prevent vine like material from gathering around the spindle shaft 24 directly. Vine like material wraps around the wedges 28 extending over the tips 32 where rotation of the cutting disc 26 allows the upper cutter 46 to shear the vine like material into lengths too short to effectively wrap around and bind the spindle shaft 24. The cutting disc 26 may be of an otherwise conventional construction to cut and mulch material including the shortened sections of vine like material.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mower deck system comprising:
a mower deck having an upper wall and a peripheral wall extending downwardly from and around a peripheral edge of said upper wall, said peripheral wall having a pair of spaced ends defining an opening therebetween;
a spindle shaft extending through said upper wall;
a pair of wedges, each of said wedges being coupled to and extending from said upper wall of said mower deck, each of said wedges having a pair of lateral sides extending from a tip, said pair of wedges being positioned on opposite sides of said spindle shaft such that said tip of each said wedge faces away from said spindle shaft; and
a cutting disc coupled to said spindle shaft wherein said pair of wedges is positioned between said cutting disc and said upper wall of said mower deck, said cutting disc being rotated by said spindle shaft,
wherein each said wedge comprises:
said lateral sides having a proximal edge coupled to said upper wall of said mower deck;
each of said lateral sides extending perpendicularly from said upper wall of said mower deck; and
each of said lateral sides having a distal edge relative to said upper wall of said mower deck.

2. The system of claim 1 further comprising said pair of wedges being linearly aligned across said spindle shaft, a line extending between said tips of said wedges being parallel to a plane extending between said spaced ends of said peripheral wall of said mower deck.

3. The system of claim 1, further comprising each said wedge having a broad end tapering towards said tip, said broad end being open.

4. The system of claim 3, further comprising each said wedge being symmetrical about a line extending through said tip of said wedge and bisecting said broad end of said wedge.

5. The system of claim 4, further comprising each of said lateral sides having a first straight section and a second straight section, said first straight section being angled relative to said second straight section.

6. The system of claim 1, wherein each wedge further includes a panel coupled to and extending between said lateral sides, said panel being positioned parallel to said upper wall of said mower deck.

7. The system of claim 6, further comprising said panel being inset from said distal edge of said lateral sides.

8. The system of claim 1, further comprising an upper cutter coupled to said cutting disc, said upper cutter being positioned to pass in close proximity to said tip of each said wedge as said cutting disc is rotated by said spindle shaft wherein said upper cutter is configured for shearing vine like material extending over each said tip as said upper cutter passes by said tip.

9. A mower deck system comprising:
a mower deck having an upper wall and a peripheral wall extending downwardly from and around a peripheral edge of said upper wall, said peripheral wall having a pair of spaced ends defining an opening therebetween;
a spindle shaft extending through said upper wall;
a pair of wedges, each of said wedges being coupled to and extending from said upper wall of said mower deck, each of said wedges having a pair of lateral sides extending from a tip, said pair of wedges being positioned on opposite sides of said spindle shaft such that said tip of each said wedge faces away from said spindle shaft, said pair of wedges being linearly aligned across said spindle shaft, a line extending between said tips of said wedges being parallel to a plane extending between said spaced ends of said peripheral wall of said mower deck, each said wedge comprising said lateral sides having a proximal edge coupled to said upper wall of said mower deck, each of said lateral sides extending perpendicularly from said upper wall of said mower deck, and each of said lateral sides having a distal edge relative to said upper wall of said mower deck, each of said lateral sides having a first straight section and a second straight section, said first straight section being angled relative to said second straight section, a broad end tapering towards said tip, said broad end being open, said wedge being symmetrical about a line extending through said tip of said wedge and bisecting said broad end of said wedge, and a panel coupled to and extending between said lateral sides, said panel being positioned parallel to said upper wall of said mower deck, said panel being inset from said distal edge of said lateral sides;

a cutting disc coupled to said spindle shaft wherein said pair of wedges is positioned between said cutting disc and said upper wall of said mower deck, said cutting disc being rotated by said spindle shaft; and an upper cutter coupled to said cutting disc, said upper cutter being positioned to pass in close proximity to said tip of each said wedge as said cutting disc is rotated by said spindle shaft wherein said upper cutter is configured for shearing vine like material extending over each said tip as said upper cutter passes by said tip.

10. A mower deck system comprising:

a mower deck having an upper wall and a peripheral wall extending downwardly from and around a peripheral edge of said upper wall, said peripheral wall having a pair of spaced ends defining an opening therebetween;

a spindle shaft extending through said upper wall;

a pair of wedges, each of said wedges being coupled to and extending from said upper wall of said mower deck, each of said wedges having a pair of lateral sides extending from a tip, said pair of wedges being positioned on opposite sides of said spindle shaft such that said tip of each said wedge faces away from said spindle shaft;

a cutting disc coupled to said spindle shaft wherein said pair of wedges is positioned between said cutting disc and said upper wall of said mower deck, said cutting disc being rotated by said spindle shaft; and an upper cutter coupled to said cutting disc, said upper cutter being positioned to pass in close proximity to said tip of each said wedge as said cutting disc is rotated by said spindle shaft wherein said upper cutter is configured for shearing vine like material extending over each said tip as said upper cutter passes by said tip.

* * * * *